United States Patent
Mills et al.

[15] 3,671,026
[45] June 20, 1972

[54] DEVICE FOR EXPANSION OF EXPANDABLE POLYMER BEADS

[72] Inventors: Frank J. Mills, Beaver; John T. Sadowski, Aliquippa; Harwood H. Squires, Georgetown; James J. Uebelhart, Beaver, all of Pa.

[73] Assignee: Sinclair-Koppers Company

[22] Filed: Nov. 2, 1970

[21] Appl. No.: 85,841

[52] U.S. Cl. ............................................ 263/21 B, 18/DIG. 39
[51] Int. Cl. .................................................. F27b 15/00
[58] Field of Search ............... 18/DIG. 39; 263/21 B; 264/51, 264/53, DIG. 9

[56] References Cited

UNITED STATES PATENTS 3,132,846  5/1964  Siddall ............................... 263/21 B

*Primary Examiner*—John J. Camby
*Attorney*—Sherman H. Barber, Oscar B. Brumback and Olin E. Williams

[57] ABSTRACT

An apparatus is provided wherein large low-density interlocking particles are made by expanding thermoplastic polymer beads containing a normally liquid organic blowing agent. The beads are expanded by heating to the temperature of expansion with steam in a rotating tube. Gentle agitation is provided by a combination of the tumbling action of the rotating tube and the action of the steam rising through the expanding beads. The resultant uniformly expanded particles are not crushed or shredded. The particles are suitable for use in loose-fill packaging of shock-sensitive materials.

6 Claims, 2 Drawing Figures

INVENTORS
FRANK J. MILLS, JOHN T. SADOWSKI,
HARWOOD H. SQUIRES & JAMES J. UEBELHART

BY Sherman H. Barber
Attorney

DEVICE FOR EXPANSION OF EXPANDABLE POLYMER BEADS

BACKGROUND OF THE INVENTION

Loose-fill packaging is usually large, low-density interlocking particles. These particles are produced by expanding thermoplastic polymer beads containing a normally liquid organic blowing agent. The expansion of the beads may be carried out in many ways, but notably is carried out either in stirred tanks or on moving belts. For example, Rodman in U.S. Pat. No. 3,023,175, teaches the partial expansion of expandable beads by subjecting the beads to steam heat in a stirred tank. The problem involved in this type of expander, when attempting to produce the large, expanded packaging particles, is that the stirrer tends to crush or tear the particles. Oswall et al. in U.S. Pat. No. 3,225,384, and Edberg, in U.S. Pat. No. 3,015,479, teach the expansion of expandable beads by subjecting the beads to radiant heat while passing the beads under the heat source on a moving conveyor belt. In this type of apparatus the particles are not agitated and the particles have a tendency to fuse or lace together. Yet another type of expansion apparatus is described by Adams et al., U.S. Pat. No. 3,494,988, which teaches partial expansion of beads in an open, rotating pan by either directly heating the beads by radiant heaters or indirectly heating the beads by means of burners or radiant elements below the pan. This apparatus has the disadvantages of low capacity for material and low degree of agitation caused by the rotation of the pan.

The apparatus of the present invention is useful for expanding thermoplastic-polymer beads containing a normally liquid organic blowing agent.

Thermoplastic polymer beads suitable for use in the apparatus may be made from polystyrene, polyvinyl chloride, polyvinylidene chloride, polymers of alkyl substituted styrenes, polyacrylic esters, and polymethacrylic esters; copolymers of styrene and alpha-methylstyrene and also alkyl substituted styrenes as vinyl toluene, copolymers of styrene with small amounts of divinyl benzene, copolymers of butadiene or other dienes or acrylonitrile and styrene in compositions having at least 50 percent styrene and mixtures of polystyrene and rubbers, both natural and synthetic. The beads are generally round, but may be pillow-shaped, or irregularly shaped due to comminution.

The blowing agent may be a volatile aliphatic or cycloaliphatic hydrocarbon, such as petroleum ether, pentane, hexane, heptane, cyclopentane, cyclohexane, cyclopentadiene, and mixtures thereof which have a boiling point lower than the softening point of the polymer. These expanding agents generally constitute 3 to 15 percent of the total weight of the mixture.

SUMMARY OF THE INVENTION

It has now been found that expandable thermoplastic beads can be expanded continuously, without crushing or shredding the product particles, by heating the beads with steam in a rotating tube. A mild agitation is effected by a combination of the tumbling action of the rotating tube and the action of the steam as it rises through a mixture of the unexpanded beads or pellets and the particles in varying stages of expansion.

DETAILED DESCRIPTION OF THE INVENTION

Figure 1:
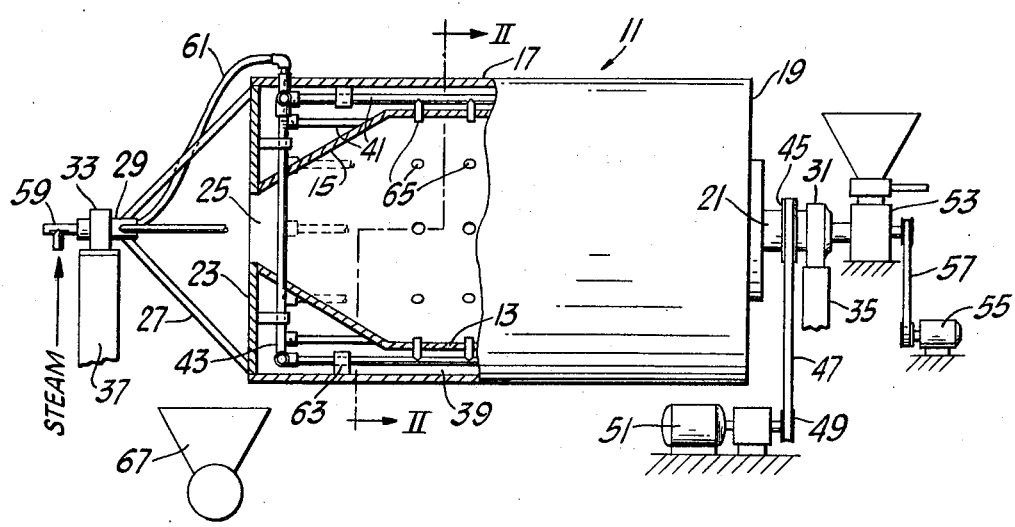
FIG. 1 is a side elevation, partially in section, of an expander in accordance with the invention.

A preferred embodiment of the present invention is shown in FIG. 1 of the drawing.

The expander 11 comprises a cylindrical tubular portion 13 that is joined to a frusto-conical portion 15, both of which are surrounded in spaced-apart relation by a cylindrical jacket 17. The jacket 17 and the one end of the cylindrical tubular portion 13 are closed by an end closure 19 to which is mounted a first hollow shaft 21 that communicates with the interior space of the tubular portion 13. Another end closure 23 is fitted to the jacket 17 and has a central opening 25 therein that is secured peripherally to the frusto-conical portion 15, as shown in FIG. 1.

The end closure 23 is connected to a plurality of spaced apart bars or rods 27 that are also connected to a second hollow shaft 29. Both shafts 21 and 29 are journaled in bearings 31 and 33 respectively that are mounted to support pedestals 35 and 37.

Figure 2:
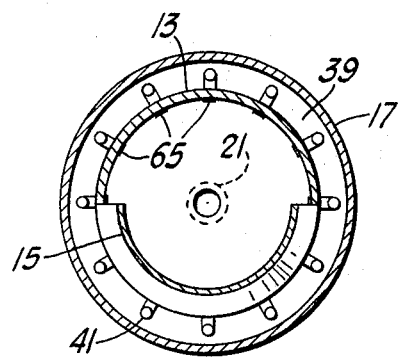
FIG. 2 is a view along line II—II of FIG. 1.

Between the jacket 17 and the inner cylindrical tubular portion 13 there is an annular space 39 which provides a location through which a plurality of spaced apart parallel fluid conductive branch lines 41 are arranged. The space between the branch lines 41 may be left open to serve as an insulating air space, or may be filled with a suitable insulation to insure efficient use of the steam in expanding beads in the tube 13. The spatial arrangement of the jacket 17, steam branch lines 41, and tube 13 can be more easily visualized by reference to FIG. 2.

A circular header 43 is provided within the annular space 39 and the several steam branch lines 41 are each fluidly connected to the circular header 43.

The tube 13 is rotated by means of pulley 45 mounted on the hollow shaft 21 and driven by belt 47 connected to a pulley 49 on an externally mounted drive motor 51. The expandable beads are fed into the expander 11 through the hollow support shaft 21 by means of a conventional feed mechanism 53 driven by an external drive motor 55 and by means of a belt and pulley arrangement 57.

Steam is introduced into the tube 13 through a conventional rotary joint 59 and flexible feed pipe 61 communicating with the header 43, and thence by way of the plurality of branch feed lines 41 which may be supported in the space 39 by means of blocks 63 fixed to the tube jacket 17.

The branch lines 41 have injection nozzles 65 evenly dispersed therealong and the nozzles 65 project into the tube 13.

Agitation of the mixture of beads and expanded particles is provided by a combination of the rotation of the tube 13 and jacket 17 about the bearings 31 and 33, and the action of the steam rising through the mixture. This combination provides a gentle agitation which does not crush or shred the expanded particles, in contrast to prior art methods of expanding referred to previously using a paddle or stirrer to agitate the mixture.

The rotation of the tube and the mixing action of the steam causes the lighter expanded particles to rise to the surface of the mixture, while the heavier unexpanded beads remain at the bottom of the mixture. The thus separated expanded particles gradually work their way upward and outward until they are forced, by the continual introduction of new beads, to move toward the central opening 25 in the open end 23 of the tube 13, to climb the inclined frusto-conical portion 15 and to tumble out of the opening 25 of the expander into hopper 67 from which they are conveyed to storage.

Sticking of beads and particles to the inner walls of the tube may be avoided by coating the walls with any suitable material; one such material being a polytetrafluoroethylene product marketed by E. I. duPont de Nemours & Company under the trademark TEFLON.

In another embodiment of the apparatus, not shown, the steam may be introduced into the tube through a single stationary probe inserted through the closed end of the tube and having a plurality of holes dispersed along its length through which holes the steam issues onto the beads. In this embodiment, additional steam may be directed to the outside of the tube through an external stationary probe. The gentle agitation in this embodiment is provided by a combination of the rotation of the tube and the direct impingement of the steam upon the expanding pellets or beads.

The inclined frusto-conical portion 15 of the tube 13 may be replaced in some applications, if desired, by short angular baffles (not shown) mounted on the inside wall of the tube to lift the expanded particles through the annular overflow orifice 25.

A feature of the present invention is that the steam rises through the expanding beads to help provide better heating and gentle agitation.

A feature of the present invention is that the beads may be expanded continuously without crushing or shredding the expanded particles.

Although the invention has been described herein with a certain degree of particularity, it is understood that the present disclosure has been made only as an example and that the scope of the invention is defined by what is hereinafter claimed.

What is claimed is:

1. Apparatus for expanding expandable thermoplastic polymer beads comprising:
    a. a first cylindrical tubular member having end closures in one end of which there is an aperture;
    b. means connected to said tubular member for supporting and rotating said first tubular member about an axis;
    c. a second cylindrical tubular member surrounding said first tubular member in spaced apart relation and forming an annular space with said first tubular member;
    d. a plurality of fluid conduits arranged and supported in said annular space, each said conduit having one or more nozzles extending through said second tubular member;
    e. means for flowing a heated fluid in said fluid conduits;
    f. means for introducing said beads into said first tubular member;
    g. means for rotating said first and second tubular members while said heated fluid flows into said first tubular member whereby said beads expand into foamed polymer particles; and
    h. means to remove the foamed polymer particles from said first tubular member.

2. The apparatus of claim 1 wherein:
    a. said one end of said first tubular member is frusto-conical in shape.

3. The apparatus of claim 1 wherein:
    a. the means supporting said first tubular member comprises an opposed pair of hollow shafts journaled in bearing supports; and including
    b. means flowing steam in one shaft and means flowing beads in the other shaft; and
    c. means conveying steam from said shaft to said fluid conduits.

4. The apparatus of claim 3 wherein:
    a. said means for flowing a heated fluid in said conduits includes a header conduit disposed in said annular space and fluidly connected to said fluid conduits.

5. An apparatus for the expansion of expandable thermoplastic polymer beads comprising:
    a. a tube having a closed end and an open end;
    b. means for rotating said tube;
    c. means for introducing expandable polymer beads into one end of said tube as said tube rotates;
    d. means for heating said expandable polymer beads in said tube whereby said beads expand into foamed polymer particles;
    e. means for separating said particles from said beads; and
    f. means for removing said particles from said tube.

6. The apparatus of claim 5 wherein:
    a. said means for heating said expandable polymer beads comprises a plurality of injection nozzles through which steam flows into said tube and into contact with said beads.

* * * * *